April 29, 1930.                J. H. CLARK                1,756,147
                              SEAT ASSEMBLY
                         Filed Dec. 31, 1928          3 Sheets-Sheet 1
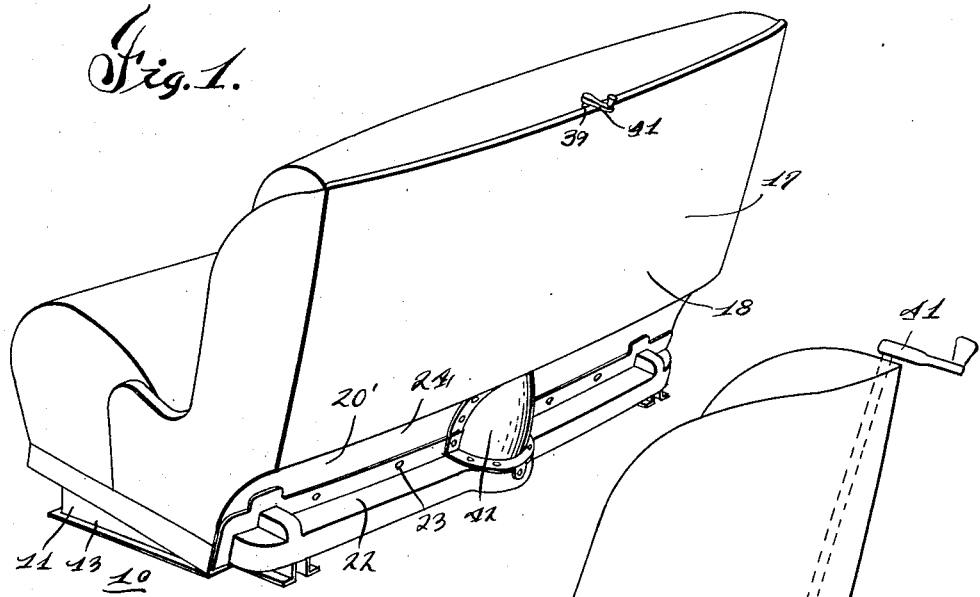
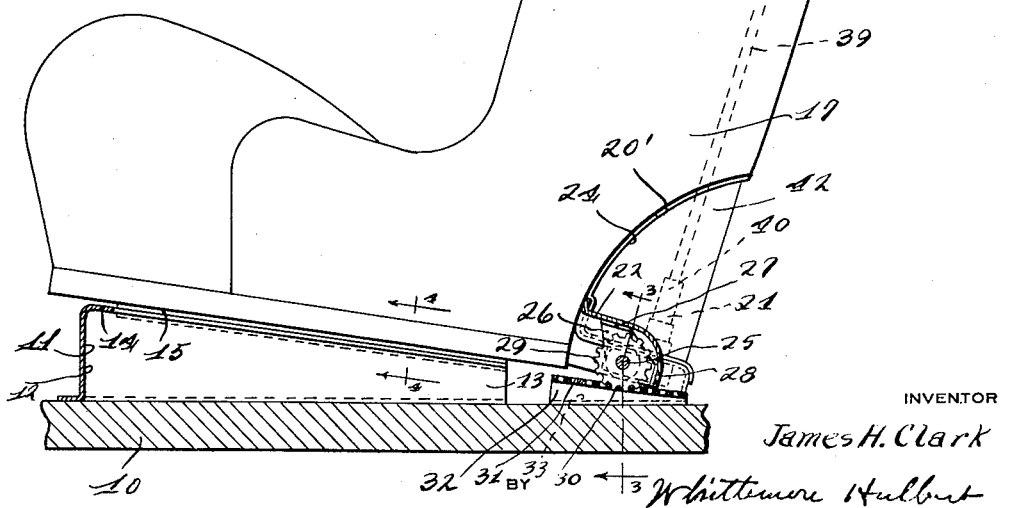
INVENTOR
James H. Clark
Whittemore Hulbert
Whittemore & Belknap
ATTORNEYS April 29, 1930.  J. H. CLARK  1,756,147
SEAT ASSEMBLY
Filed Dec. 31, 1928  3 Sheets-Sheet 2

INVENTOR
James H. Clark
BY Whittemore Hulbert
Whittemore & Belknap
ATTORNEYS

April 29, 1930.  J. H. CLARK  1,756,147
SEAT ASSEMBLY
Filed Dec. 31, 1928   3 Sheets-Sheet 3

INVENTOR
James H. Clark
BY Whittemore Hulbert
Whittemore Belknap
ATTORNEYS

Patented Apr. 29, 1930

1,756,147

UNITED STATES PATENT OFFICE

JAMES H. CLARK, OF DETROIT, MICHIGAN, ASSIGNOR TO BRIGGS MANUFACTURING COMPANY, OF DETROIT, MICHIGAN, A CORPORATION OF MICHIGAN

SEAT ASSEMBLY

Application filed December 31, 1928. Serial No. 329,638.

This invention relates generally to seat assemblies and has particular reference to adjustable seats adapted for use in connection with vehicle bodies and the like.

One of the primary objects of the present invention is to provide an adjustable seat for vehicles distinguished by its simplicity of construction and operation which not only enhances its value both mechanically and commercially but provides a design of a strong and durable nature.

Another object of this invention is to provide actuating mechanism for adjusting the seat which is inherently self locking and which in addition to moving the seat relative to its support, actually guides the seat throughout movement thereof and prevents the same from twisting or moving laterally upon the support.

A further advantageous feature of the present invention is the provision of a mounting for the actuating mechanism which in addition to supporting the latter, conceals the same from view and thereby gives the entire construction a neat and pleasing appearance.

Other objects and novel features of construction will be made more apparent as this description proceeds especially when considered in connection with the accompanying drawings wherein:

Figure 1 is a side elevation of a seat constructed in accordance with this invention;

Figure 2 is a fragmentary elevational view of the construction shown in Figure 1 with certain parts broken away for the sake of clearness;

Figure 3:
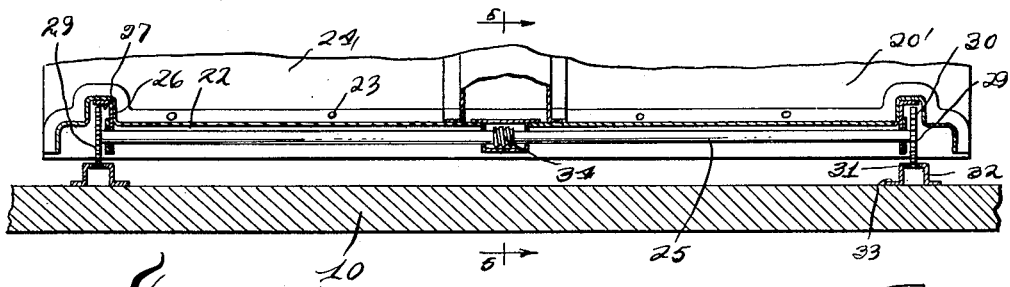
Figure 3 is a sectional view taken on the line 3—3 of Figure 2.
Figure 4:
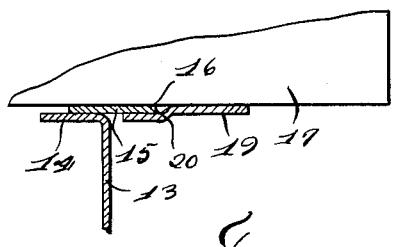
Figure 4 is a sectional view taken on the line 4—4 of Figure 2.
Figure 5:
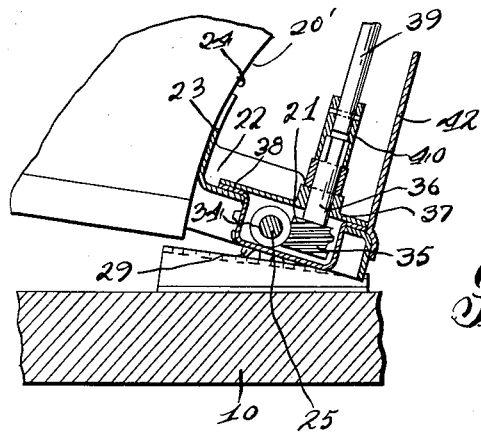
Figure 5 is a sectional view taken on the line 5—5 of Figure 3.

Referring now more in detail to the construction illustrated in the drawings and with special reference to Figures 1 to 5 inclusive, it will be noted that there is illustrated in Figure 1, a floor portion 10 of a vehicle and a seat riser 11 extending upwardly from the said floor portion and secured thereto. The riser 11 is preferably formed of a single sheet of metal and is provided with front and side walls 12 and 13 respectively terminating at the upper ends thereof in inwardly extending flanges 14. Extending longitudinally of the side walls 13 and seated upon the flanges 14 thereof, are a pair of plates 15 having the outer longitudinal edge portions 16 thereof projecting outwardly beyond the side wall 13.

Supported upon the riser 11 and slidable relative thereto is a suitable seat 17 having a back rest 18. The sliding connection between the seat and riser is accomplished by means of a pair of plates 19 secured to the bottom of the seat 17 and having the inner longitudinal edge portions thereof bent downwardly from the bottom of the seat so as to form a longitudinally extending groove 20, the disposition of the plates 19 upon the bottom of the seat being so determined that the grooves 20 receive the longitudinal edge portions 16 of the plates 15. Thus it will be noted that a slidable interlocking connection is accomplished between the seat and riser which will prevent the seat from a tilting or rocking movement relative to its support.

The seat back 18 is preferably formed with an inwardly depressed portion 20' at the lower end thereof for receiving the operating mechanism 21 for adjusting the seat relative to its support. The operating mechanism is preferably housed within a suitable casing 22 secured as at 23 to the wall 24 of the depressed portion 20'. This mechanism comprises a shaft 25 extending substantially the full width of the seat and journalled within brackets 26 having flanged portions 27 and 28 secured respectively to the top and rear wall of the housing 22. Secured to the shaft 25 adjacent the opposite ends thereof is a pair of pinions 29 having suitable teeth 30 adapted to engage slots 31 formed within the racks 32. The latter are preferably substantially channel-shaped in cross section and are provided at the lower ends thereof with oppositely extending flanges 33 adapted to rest upon the floor portion 10 of the vehicle and to be secured thereto. The top slotted walls of the racks are preferably inclined at an angle coincident to the angle of inclination of the side walls of the riser.

For rotating the shaft to effect a longitudinal movement of the pinions 29 upon the racks 32, I provide the following mechanism: Secured to the shaft intermediate the ends thereof is a suitable worm gear 34 adapted to mesh with a corresponding worm 35 secured to the lower end of a substantially vertically extending stub shaft 36. The latter is preferably journalled in a second housing 37 having a portion projecting through a suitable aperture formed in the top wall of the housing 22 and having another portion 38 secured to the top wall. This housing preferably conceals the intermeshing worm gear 34 and worm 35 upon the shaft 25 and stub shaft 36 respectively. In order to impart rotation to the stub shaft 36 a second substantially vertically extending shaft 39 is provided. As shown, the lower end of the shaft 39 is preferably operatively connected to the stub shaft 36 by means of a suitable coupling member 40 and the upper end of this shaft extends through the seat back 18 and projects beyond the top of the latter a sufficient distance to permit the mounting of a suitable operating handle 41. Thus from the foregoing it will be apparent that adjustment of the seat relative to the support may be readily accomplished by merely manually rotating the handle 41. This rotation of the handle 41 will produce a corresponding rotation of the shafts 39 and 36 and through the gearing 34 and 35 will effect a rotation of the shaft 25 which will cause the pinions 30 to move longitudinally of the racks and inasmuch as these pinions are carried by the seat proper, the latter will be moved relative to its support.

In order to provide a neat and efficient construction the operating mechanism including the housings 22 and 37 are concealed by means of a plate 42 having the lower end portions secured to the top wall of the depressed portion 20 in such a manner as to form a continuation of the rear wall of the seat.

Thus from the foregoing it will be noted that I have provided a comparatively simple seat construction capable of being adjusted relative to its support and distinguished by the minimum number of parts utilized for accomplishing this adjustment which not only permits the entire construction to be economically manufactured but expedites production to a great extent owing to the rapidity with which the seat may be assembled within the vehicle body. It will further be noted that by reason of the cooperating racks and pinions secured respectively to the support and seat, movement of the latter will be limited to a predetermined rectilinear path. In other words twisting or lateral movements of the seat relative to its support is efficiently prevented by the operating mechanism hereinbefore set forth.

Figure 6:
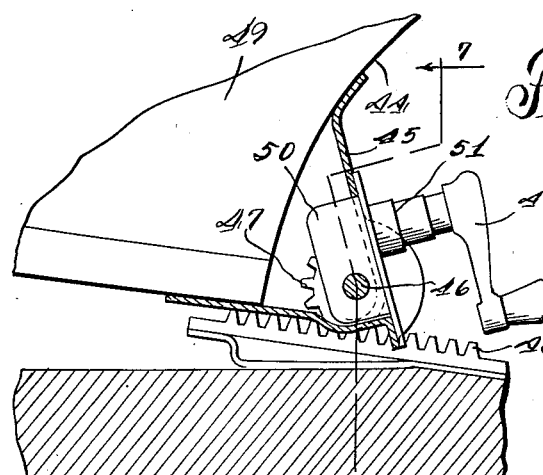
Figure 6 is a view similar to a portion of Figure 2 showing a slightly modified form of construction.
Figure 7:
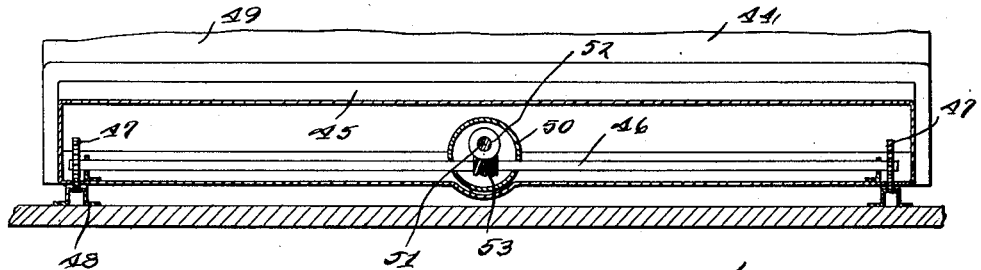
Figure 7 is a sectional view taken on the line 7—7 of Figure 6.

Referring now to the modified form of construction illustrated in Figures 6 and 7, it will be noted that the only material difference between this form of the invention and the previously described form, is that the operating handle 43 for adjusting the seat relative to its support, is disposed within the depressed portion 44 of the seat back. In other words in the construction illustrated in Figures 6 and 7 the substantially vertically extending shafts 39 and 40 are eliminated and the construction simplified to a great extent. The particular means for slidably connecting the seat to the riser is substantially the same as hereinbefore set forth in connection with the first described form of the invention and as a consequence a detailed description of the same will not be given in this instance.

As shown in Figure 6, a suitable housing 45 is secured to the seat and projects rearwardly therefrom. Journalled within the housing and extending substantially the full width of the seat as in the first described form of the invention is a shaft 46 having pinions 47 secured thereto adjacent the ends thereof. These pinions are adapted to mesh with the racks 48 which as shown, are secured to the floor portion of the vehicle and assume an angle coincident with the angle of inclination of the seat 49. Secured to the rear wall of the housing and having a portion projecting through an opening in the same is a second housing 50 forming a journal for the shaft 51 having a worm gear 52 secured to the forward end thereof and adapted to mesh with a corresponding worm wheel 53 also arranged within the housing and secured to the shaft 46 intermediate the ends thereof. The rear end of the shaft preferably projects out of the housing 50 a sufficient distance to form a mounting for the operating handle 43.

The operation of the latter form of the invention is substantially the same as in the first described form in that rotation of the handle 43 and shaft 51 will effect a corresponding rotation of the shaft 46 and as a consequence move the pinions 47 longitudinally of the racks 48 to adjust the seat relative to its support.

Figure 8:
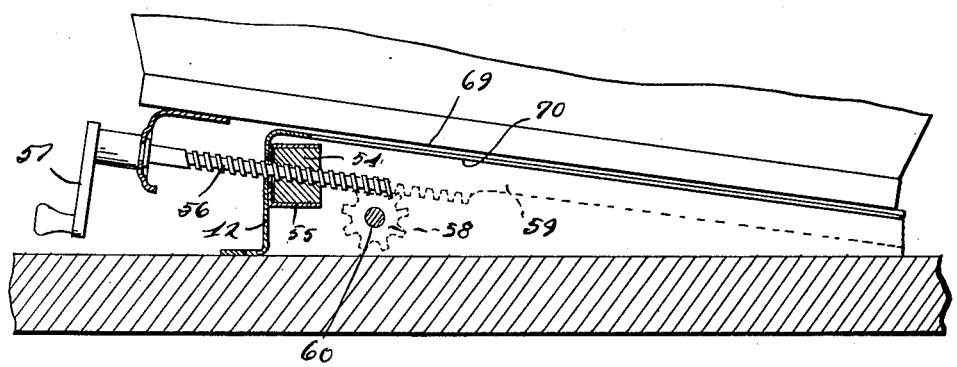
Figure 8 is a view similar to Figure 5 showing another modified form of construction.
Figure 9:
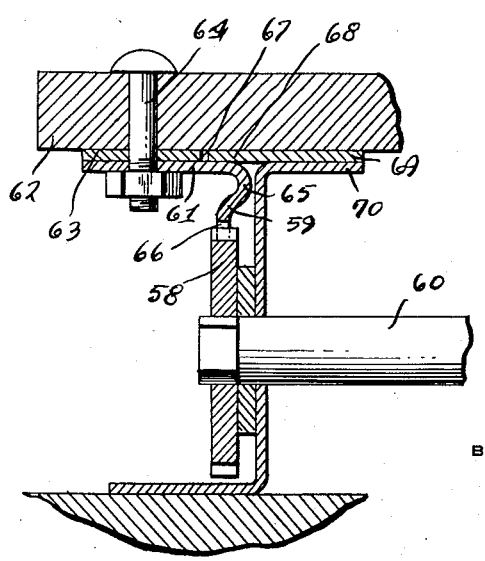
Figure 9 is a sectional view taken on the line 9—9 of Figure 8.

The modified form of adjustable seat illustrated in Figures 8 and 9 is essentially different from either of the foregoing described constructions in that the operating mechanism for sliding the seat relative to the support consists in a nut 54 universally mounted in a casing 55 secured to the front wall 12 of the riser and in such a position as to be engaged by the travelling screw 56. The latter is preferably journaled within a suitable plate secured to the seat bottom and is adapted to be rotated by means of a handle 57. In this form of the invention the pinions 58 and cooperating racks 59 merely operate to prevent lateral or twisting movements of the seat relative to its support, and as a consequence are not connected to the operating mechanism. Referring more in detail to this construction it will be noted that the pinions 58 are mounted upon opposite ends of a suitable shaft 60 which as shown, is journaled in the side walls of the riser. The racks 59 constitute plates 61 secured in spaced relation to the bottom of the seat 62 by means of a suitable spacer 63 and fastening elements 64. The inner longitudinal edge portions 65 of the plates 61 are preferably bent downward as shown in Figure 9 and are found with a series of teeth 66 adapted to mesh with the pinions 58. As illustrated in Figure 9 the inner longitudinal edge portions of the plates 61 project inwardly beyond the spacer and cooperate with the bottom of the seat 62 to form a longitudinally extending groove 67 for receiving the outer longitudinal edge portions 68 of a pair of plates 69 which are secured in any suitable manner to the riser flanges 70. Thus from the foregoing, it will be apparent that the plates 61 in addition to forming the racks for the pinions 58 also cooperate with the plates 69 to form a sliding connection between the seat and its support.

While several forms of the invention have been described herein somewhat in detail, it should be understood that various modifications will suggest themselves to those skilled in this art and as a consequence, reservation is made to make such changes in many of the essential and all of the non-essential details as may come within the purview of the accompanying claims.

What I claim as my invention is:

1. In combination, a supporting member, a seat member mounted for sliding movement relative to the supporting member, laterally spaced racks secured to one of said members, a shaft journalled in the other of said members, pinions upon said shaft and engageable with the racks aforesaid, a second shaft extending at substantially right angles to the shaft aforesaid, and terminating above the seat member, an operable connection between the two said shafts, and means including an operating handle carried by the second shaft above the seat member for rotating said second shaft to cause said pinions to move longitudinally of the racks and effect an adjustment of the seat relative to the support.

2. In combination, a supporting member, a seat member having a back rest provided with an inwardly depressed portion at the lower end thereof, means permitting sliding movement of the seat member relative to the supporting member, operating mechanism arranged within the depressed portion aforesaid for sliding said seat member relative to the supporting member, and means secured to said seat and cooperating with the depressed portion aforesaid to conceal the operating mechanism.

3. In combination, a supporting member, a seat member having a back rest provided with an inwardly depressed portion at the lower end thereof, means permitting sliding movement of the seat member relative to the supporting member, operating mechanism arranged within the depressed portion aforesaid for sliding said seat member relative to the supporting member, and a plate forming a closure for said depressed portion and operable to conceal the operating mechanism aforesaid, said plate also forming a continuation of the back rest.

4. In combination, a supporting member, a seat member slidably mounted relative to the supporting member, a rack secured to the latter member, a shaft journalled on the seat member, a pinion mounted upon said shaft and engageable with said rack, operating mechanism including a shaft extending above said seat member and connected to the shaft aforesaid for rotating the latter to cause said pinion to travel longitudinally of said rack and thereby slide the seat relative to the supporting member and an operating handle above the seat member and connected to the last mentioned shaft.

5. In combination, a supporting member, a seat member having a back rest provided with an inwardly depressed portion at the lower end thereof, means permitting sliding movement of the seat member relative to the supporting member, means for adjusting the seat member relative to the supporting member arranged within the depressed portion aforesaid of the seat back and operating means for said adjusting means including an element above the seat back rest.

6. In combination, a seat, a seat riser having an upright wall portion and a lateral flange at the upper edge of said portion, a plate secured to the bottom of the seat and having a portion offset therefrom and providing a longitudinally extending groove, the lateral flange and offset portion aforesaid being in a common horizontal plane, and a plate resting upon and constituting a bridge between the upper faces of said lateral flange and offset portion, said last mentioned plate being secured to the lateral flange and slidable longitudinally of said groove.

7. In combination, a seat riser, a rack spaced from but in alignment with said riser, a seat slidable longitudinally of the riser, and actuating means for the seat including a shaft extending across the seat at the base thereof, pinions carried by the shaft and engaging the rack, and means for operating the shaft from a point above the seat including an element extending through the seat and operatively connected to said shaft.

In testimony whereof I affix my signature.

JAMES H. CLARK.